United States Patent
Peterson et al.

(10) Patent No.: US 12,499,607 B2
(45) Date of Patent: *Dec. 16, 2025

(54) IMPORTANCE SAMPLING FOR DETERMINING A LIGHT MAP

(71) Applicant: Imagination Technologies Limited, Kings Langley (GB)

(72) Inventors: Luke T. Peterson, San Francisco, CA (US); Justin P. DeCell, San Francisco, CA (US); Jens Fursund, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,235

(22) Filed: Jun. 18, 2024

(65) Prior Publication Data

US 2024/0338883 A1 Oct. 10, 2024

Related U.S. Application Data

(63) Continuation of application No. 17/969,383, filed on Oct. 19, 2022, now Pat. No. 12,014,457, which is a
(Continued)

(51) Int. Cl.
*G06T 15/06* (2011.01)
*G06T 15/00* (2011.01)
(Continued)

(52) U.S. Cl.
CPC .............. *G06T 15/06* (2013.01); *G06T 15/00* (2013.01); *G06T 15/005* (2013.01); *G06T 15/04* (2013.01);
(Continued)

(58) Field of Classification Search
None
See application file for complete search history.

(56) References Cited

U.S. PATENT DOCUMENTS

| | | | |
|---|---|---|---|
| 5,883,814 A | 3/1999 | Luk et al. | |
| 6,226,005 B1 | 5/2001 | Laferrière | |

(Continued)

FOREIGN PATENT DOCUMENTS

| | | |
|---|---|---|
| CN | 104183009 A | 12/2014 |
| EP | 3116227 A1 | 1/2017 |
| JP | H10293782 A | 11/1998 |

OTHER PUBLICATIONS (Note: copies of NPL in parent applications).
(Continued)

*Primary Examiner* — Jason A Pringle-Parker
(74) *Attorney, Agent, or Firm* — Potomac Law Group, PLLC; Vincent M DeLuca

(57) ABSTRACT

A light map for a scene is determined for use in rendering the scene in a graphics processing system. Initial lighting indications representing lighting within the scene are determined. For a texel position of the light map, the initial lighting indications are sampled using an importance sampling technique to identify positions within the scene. Sampling rays are traced between a position in the scene corresponding to the texel position of the bounce light map and the respective identified positions with the scene. A lighting value is determined for the texel position of the light map using results of the tracing of the sampling rays. By using the importance sampling method described herein, the rays which are traced are more likely to be directed towards more important regions of the scene which contribute more to the lighting of a texel.

20 Claims, 7 Drawing Sheets

Related U.S. Application Data continuation of application No. 17/308,979, filed on May 5, 2021, now Pat. No. 11,494,970, which is a continuation of application No. 16/400,594, filed on May 1, 2019, now Pat. No. 11,030,794, which is a continuation of application No. 15/456,865, filed on Mar. 13, 2017, now Pat. No. 10,325,401.

(60) Provisional application No. 62/306,887, filed on Mar. 11, 2016.

(51) Int. Cl.
  *G06T 15/04* (2011.01)
  *G06T 15/50* (2011.01)

(52) U.S. Cl.
  CPC ........ *G06T 15/506* (2013.01); *G06T 2215/12* (2013.01); *G06T 2215/16* (2013.01)

(56) References Cited

U.S. PATENT DOCUMENTS

| | | |
|---|---|---|
| 6,697,062 B1 | 2/2004 | Cabral et al. |
| 8,072,454 B1 | 12/2011 | Aila et al. |
| 8,436,855 B1 | 5/2013 | Morgan et al. |
| 2003/0032479 A1 | 2/2003 | LeMay et al. |
| 2004/0032409 A1 | 2/2004 | Girard |
| 2013/0002671 A1 | 1/2013 | Armsden et al. |
| 2013/0038618 A1* | 2/2013 | Urbach ................ G06F 9/5005 345/522 |
| 2014/0267357 A1 | 9/2014 | Tartaglia et al. |
| 2014/0292757 A1 | 10/2014 | Tokuyoshi |
| 2014/0327673 A1 | 11/2014 | Sousa |
| 2014/0327690 A1 | 11/2014 | McGuire et al. |
| 2014/0375659 A1 | 12/2014 | McGuire et al. |
| 2015/0262407 A1 | 9/2015 | Fursund et al. |
| 2015/0262409 A1 | 9/2015 | Morgan et al. |
| 2017/0032500 A1* | 2/2017 | Csèfalvay ................ G06T 5/70 |

OTHER PUBLICATIONS

Georgiev et al; "Importance Caching for Complex Illumination", Computer Graphics Forum; vol. 31, No. 2 pt3, May 1, 2012 (May 1, 2012), pp. 701-710.

Lu; "Importance Sampling of Realistic Light Sources"; Feb. 27, 2014; Retrieved from the Internet: URL:https://tel.archieves-ouvertes.fr/tel-00977100/file/LU_HEQI_2014.pdf.

Sloan, "Stupid Spherical Harmonics (SH) Tricks," Microsoft Corporation, Jan. 2008.

Voica, "Unite 2014, Seattle: PowerVR Ray Tracing Behind the Lightmaps in the Unity Editor," Imagination Irechnologies, Aug. 25, 2014, pp. 1-8.

* cited by examiner

| 0.0 | 0.0 | 0.0 | 0.0 | 0.0 | 1.0 | 1.0 | 1.0 | 1.0 | 1.0 | 0.0 | 0.0 | 0.0 | 0.0 | 0.0 |
|---|---|---|---|---|---|---|---|---|---|---|---|---|---|---|
| 0.0 | 0.0 | 0.0 | 1.0 | 1.0 | 0.5 | 0.5 | 0.5 | 0.5 | 0.5 | 0.5 | 1.0 | 1.0 | 0.0 | 0.0 |
| 0.0 | 0.0 | 1.0 | 0.5 | 0.5 | 0.0 | 0.0 | 0.0 | 0.8 | 0.8 | 0.8 | 0.5 | 0.5 | 1.0 | 0.0 |
| 0.0 | 1.0 | 0.5 | 0.0 | 1.0 | 1.0 | 1.0 | 0.0 | 0.0 | 0.8 | 0.8 | 0.0 | 0.5 | 1.0 | 0.0 |
| 0.0 | 1.0 | 0.5 | 0.0 | 0.0 | 0.0 | 0.0 | 0.0 | 0.8 | 0.8 | 0.8 | 0.0 | 0.5 | 1.0 | 0.0 |
| 1.0 | 0.5 | 0.0 | 0.0 | 1.0 | 1.0 | 1.0 | 0.0 | 0.0 | 0.8 | 0.8 | 0.0 | 0.0 | 0.5 | 1.0 |
| 1.0 | 0.5 | 0.0 | 0.0 | 0.0 | 0.0 | 0.0 | 0.0 | 0.8 | 0.8 | 0.8 | 0.0 | 0.0 | 0.5 | 1.0 |
| 1.0 | 0.5 | 0.0 | 0.0 | 0.0 | 0.0 | 0.0 | 0.0 | 0.0 | 0.8 | 0.8 | 0.0 | 0.0 | 0.5 | 1.0 |
| 1.0 | 0.5 | 0.0 | 0.0 | 0.0 | 0.0 | 0.0 | 0.0 | 0.0 | 0.0 | 0.0 | 0.0 | 0.0 | 0.5 | 1.0 |
| 1.0 | 0.5 | 0.0 | 0.0 | 0.0 | 0.0 | 1.0 | 0.0 | 0.0 | 0.0 | 0.0 | 0.0 | 0.0 | 0.5 | 1.0 |
| 0.0 | 1.0 | 0.5 | 0.0 | 0.0 | 1.0 | 0.0 | 0.0 | 0.0 | 0.0 | 0.0 | 0.0 | 0.0 | 0.5 | 1.0 |
| 0.0 | 1.0 | 0.5 | 0.0 | 0.0 | 1.0 | 0.0 | 1.0 | 0.0 | 0.0 | 0.0 | 0.0 | 0.5 | 1.0 | 0.0 |
| 0.0 | 0.0 | 1.0 | 0.5 | 0.0 | 1.0 | 1.0 | 1.0 | 0.0 | 0.0 | 0.0 | 0.0 | 0.5 | 1.0 | 0.0 |
| 0.0 | 0.0 | 0.0 | 1.0 | 0.5 | 0.0 | 0.0 | 0.5 | 0.0 | 0.0 | 0.0 | 0.5 | 1.0 | 0.0 | 0.0 |
| 0.0 | 0.0 | 0.0 | 0.0 | 1.0 | 0.5 | 0.5 | 1.0 | 0.5 | 0.5 | 0.5 | 1.0 | 0.0 | 0.0 | 0.0 |
| 0.0 | 0.0 | 0.0 | 0.0 | 0.0 | 1.0 | 1.0 | 0.0 | 1.0 | 1.0 | 1.0 | 0.0 | 0.0 | 0.0 | 0.0 |

FIGURE 6a

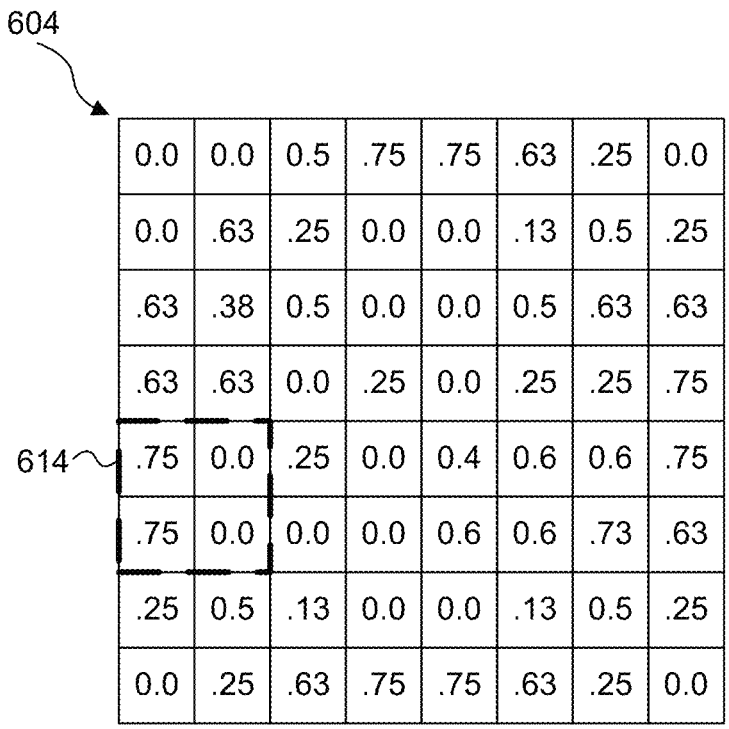
FIGURE 6b
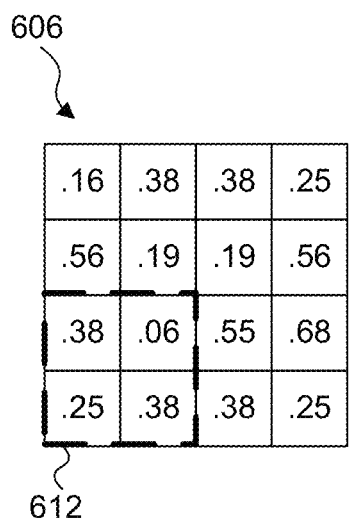 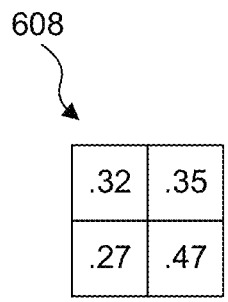 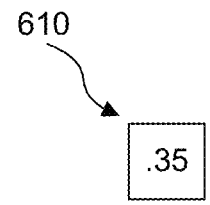
FIGURE 6c                FIGURE 6d                FIGURE 6e

IMPORTANCE SAMPLING FOR DETERMINING A LIGHT MAP

CROSS-REFERENCE TO RELATED APPLICATIONS AND CLAIM OF PRIORITY

This application is a continuation under 35 U.S.C. 120 of copending application Ser. No. 17/969,383 filed Oct. 19, 2022, now U.S. Pat. No. 12,014,457, which is a continuation of prior application Ser. No. 17/308,979 filed May 5, 2021, now U.S. Pat. No. 11,494,970, which is a continuation of prior application Ser. No. 16/400,594 filed May 1, 2019, now U.S. Pat. No. 11,030,794, which is a continuation of prior application Ser. No. 15/456,865 filed Mar. 13, 2017, now U.S. Pat. No. 10,325,401, which is a non-provisional under 35 U.S.C. 119 (e) of provisional Application Ser. No. 62/306,887 filed Mar. 11, 2016, the disclosures of which are incorporated herein by reference in their entireties.

BACKGROUND

The description herein generally relates to 3-D rendering systems, system architectures, and methods. Some of the examples described herein relate to systems, architectures, and methods for asynchronous and concurrent hybridized rendering, such as hybridized ray tracing and rasterization-based rendering.

Graphics Processing Units (GPUs) often provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, and may be adapted to be suited for particular uses. When designing a GPU, there is often a trade-off between various factors such as performance, size, power consumption and cost. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is rarely an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

As an example, ray tracing is particularly suited for introducing lighting effects into rendered images. Sources of light may be defined for a scene which cast light onto objects in the scene. Some objects may occlude other objects from light sources resulting in shadows in the scene. Rendering using a ray tracing technique allows the effects of light sources to be rendered accurately since ray tracing can be used to model the behaviour of light in the scene.

Light maps can be built which represent lighting in the scene. For example, a light map is a 2D data structure which stores indications of the luminance and colour of lighting effecting surfaces in the scene, which can be used in a similar manner to a texture in a graphics rendering process, e.g. a light map can be texture mapped onto the surface of objects in a 3D scene. In this sense a light map can be thought of as an "unwrapped" map of the surfaces in the scene capable of being lit. A light map includes values at particular positions, which may be referred to as texels of the light map. To translate from a 3D surface in the scene (e.g. a surface of a primitive) texture coordinates (u,v) associated with the point on the surface can be determined, e.g. by interpolation of texture coordinates for the vertices of the primitive. The u and v values can be used as a coordinate of the light map to determine a lighting for the primitive surface.

Ray tracing rendering techniques are often relatively computationally expensive and memory intensive to implement. For example, determining the values of a light map (which may be referred to as "baking" the light map) is often a computationally expensive process because direct lighting and/or indirect lighting should ideally be taken into account. Determining indirect lighting may require many rays may be processed for each light map texel. This means that the baking of light maps is typically performed as an "offline" process, i.e. before runtime in which images are being rendered. Calculating a light map before runtime means that the light map is usually an estimate of the lighting in the scene that is rendered at runtime, and as such errors can occur. It also means that the lightmap is incapable of responding to changes in the scene such as the moving of objects or changes to the light sources. The processing involved in baking a light map is typically too computationally expensive to be performed in real-time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a computer-implemented method of determining a bounce light map for a scene for use in rendering the scene in a graphics processing system, the method comprising:
  determining initial lighting indications representing lighting within the scene;
  for a texel position of the bounce light map:
    identifying one or more positions within the scene (e.g. using a pseudorandom technique) based on values of corresponding elements of the initial lighting indications;
    tracing one or more sampling rays between a position in the scene corresponding to the texel position of the bounce light map and the respective one or more identified positions within the scene; and
    determining a lighting value for the texel position of the render light map using results of the tracing of the one or more sampling rays.

The computer-implemented method above whereby the pseudorandom technique is an importance sampling technique, and the likelihood of identifying a given element is based on an importance value associated with each element of the of the initial lighting indications.

The importance value may be based wholly or partially on the luminance of the element of the initial lighting indications. The importance value may be based wholly or partially on known changes in the initial lighting indications. The known changes may include differences between the initial lighting indication of the present frame and the initial lighting indications of a prior frame.

The steps of sampling the initial lighting indications, tracing one or more sampling rays and determining a lighting value may be performed for each of a plurality of texel positions of the bounce light map, e.g. in parallel or in series.

The initial lighting indications may be determined as one or more initial light maps, wherein the one or more initial light maps may have the same topology as the bounce light map. The initial lighting indications may be determined by building a direct light map representing direct lighting in the scene. Furthermore, the initial lighting indications may be determined by further combining the direct light map with a bounce light map determined for a previous frame in a sequence of frames to thereby determine an initial light map for a current frame.

The initial lighting indications may comprise a bounce light map created previously. The values of elements of initial lighting indications may represent lighting for the surface areas of surfaces to which they correspond. The total value of the elements of the initial lighting indications may approximately account for the output of contributing light sources.

The effective importance value for an element in an initial light map may be influenced by the distance from the texel in the bounce light map. The effective importance value for an element in an initial light map may be influenced by the distance between a position in the scene corresponding to the element of the initial light map and a position in the scene corresponding to the texel in the bounce light map. The effective importance value for an element in an initial light map may be influenced by a direction between a position in the scene corresponding to the element of the initial light map and a position in the scene corresponding to the texel in the bounce light map.

Said sampling the initial lighting indications using a pseudorandom technique to identify one or more positions within the scene may comprises selecting one or more sampling values. The sampling values may be selected: (i) according to a low-discrepancy sequence, (ii) randomly or pseudorandomly, (iii) using a quasi-monte-carlo method, or (iii) according to a stratified sampling technique. Furthermore, the sampling values may be selected from a table of values.

Said importance sampling technique may include any of the above techniques which may be referred to herein as pseudorandom techniques. Furthermore, the sampling of the initial lighting indications using an importance sampling technique may further comprise: cumulating the importance values of the initial lighting indications according to accumulation scheme to determine a cumulative function representing the combined importance of all lighting within the initial lighting indications; using the selected one or more sampling values to identify a respective one or more positions within the cumulative function; and identifying the one or more positions within the scene corresponding to the identified one or more positions within the cumulative function.

The step of identifying one or more positions may comprises selecting one or more sampling values for sampling the initial lighting indications. Furthermore, the step of identifying one or more positions may further comprise: cumulating values of the initial lighting indications according to accumulation scheme to determine a cumulative function representing lighting within the scene; using the selected one or more sampling values to identify a respective one or more positions within the cumulative function; and identifying the one or more positions within the scene corresponding to the identified one or more positions within the cumulative function.

The respective importance values may be based wholly or partially on the luminance of the elements of the lighting indications.

In examples in which the initial lighting indications are determined as an initial light map, said cumulating values of the initial lighting indications may comprise cumulating the values in tiles of the initial light map, e.g. to form a set of mip mapped light maps representing the initial light map at different resolutions. Alternatively a hierarchical sum of values may be used where each element at a given level represents the sum of the elements at the level beneath it. The sampling values may be selected: (i) according to a low-discrepancy sequence, (ii) randomly or pseudo-randomly, or (iii) according to a stratified sampling technique, or (iv) according to a quasi-monte-carlo method. The sampling values may be selected from a table of values. A limited set of positions may be identified towards which sampling rays are traced, and those identified positions may be shared among sets of texels of the bounce light map for tracing sampling rays.

A lighting value for a texel position of the bounce light map may be determined by updating an existing lighting value for the texel position based on the results of the tracing of the one or more sampling rays. The updating of the existing lighting value for the texel position may comprise maintaining a running average for the lighting value for the texel position over a sequence of frames. The running average may effect a logarithmic decay of the values in the bounce light map. The base of the logarithmic function may be changed in response to external factors including the speed at which the initial lighting indications are changing. The running average may produce a progressive refinement effect by incrementing a numerator and a denominator separately.

In some examples, the results of tracing a sampling ray indicate whether the sampling ray hits an occlusion or whether there is an uninterrupted line-of-sight between two 3-dimensional points. The lighting value for a texel position of the bounce light map is determined based on the initial lighting indication corresponding to the identified position toward which the sampling ray is traced and whether or not the ray has found an un-occluded line-of-sight. If the results of tracing the sampling ray indicate that the sampling ray does not hit an occlusion then light energy may be added to the texel but if the sample ray hits an occlusion then light is not added but the value in the texel may be darkened in proportion to the probability of selecting the target element in the initial lighting indications. The value of the texel position may be modified in inverse proportion to the likelihood of choosing a particular sample.

The importance value for an element or set of elements in the initial lighting indications may be determined further based on an indication of a distance or approximate distance between the position in the scene corresponding to the texel position of the bounce light map and the identified position within the scene corresponding to the element or set of elements. In some examples, distance indications of multiple spatially near elements can be grouped together, and these groups can, in turn, form a hierarchy for quickly selecting elements based on approximate distance.

In some examples, the initial lighting indications are directionalised lighting values. These directionalized lighting values may arise from the modelling of different surface properties of materials in the scene. The importance value for the element or set of elements in the initial lighting indications may be determined further based on an indication of a direction or approximate direction between the position in the scene corresponding to the texel position of the bounce light map and the identified position within the scene corresponding to the elements or set of elements. In some examples, direction indications of multiple similar elements can be grouped together, and these groups can, in turn, form a hierarchy for quickly selecting elements based on approximate direction.

The elements of the initial lighting indications may be organized into a hierarchy based on the spatial locations of the corresponding points. The initial lighting indications may be directionalized lighting values, and the elements of the initial lighting indications may be organized into a hierarchy based on the predominant directions of the values stored in directionalized lighting values.

The method may further comprise rendering an image using the bounce light map to determine lighting of surfaces within the scene.

Bounce light maps may be determined for frames of a sequence of frames for rendering in real-time in the graphics processing system.

A subset of the texels of the bounce light maps may be selected for processing based on the visibility from a viewpoint in a scene. Texels in the bounce light maps may be prioritized based on their respective contribution to a rendered frame. The determination of contribution may be approximate and/or the prioritization may be coarse-grained. Light can represent any propagating phenomenon including non-visible electro-magnetic radiation, radio signals, acoustic vibrations, ballistic motion, and fluid dynamics.

There is provided a graphics processing unit configured to determine a bounce light map for use in rendering a scene, the graphics processing unit comprising:
one or more buffers configured to store initial lighting indications representing lighting within the scene; and
processing logic configured to:
identify (e.g. using a pseudorandom technique) one or more of positions within the scene based on values of corresponding elements of the initial lighting indications;
trace one or more sampling rays between a position in the scene corresponding to a texel position of the bounce light map and the respective one or more identified positions within the scene; and
determine a lighting value for the texel position of the bounce light map using results of tracing the one or more sampling rays.

The pseudorandom technique may be an importance sampling technique, and the likelihood of identifying a given element may be based on a respective importance value associated with the element of the initial lighting indications.

There may be provided a computer-implemented method of determining bounced lighting for a scene for use in rendering the scene in a graphics processing system, the method comprising:
determining initial lighting indications representing lighting within the scene;
determining visible surfaces from a viewpoint within a scene for each pixel in a buffer;
for each pixel:
using a pseudorandom technique to identify one or more of the 3D positions corresponding to elements of the initial lighting indications;
tracing one or more sampling rays between a position in the scene corresponding to the position of the visible surface and the respective one or more identified positions corresponding to the identified elements of the lighting indications; and
determining a lighting value for the visible surface using results of the tracing of the one or more sampling rays.

The lighting indications may comprise one or more of: a light map, a plurality of light maps, a plurality of light probes, and a plurality of light sources.

The elements of the lighting indications may be associated with an importance value and the pseudorandom technique is an importance sampling technique.

The importance value may be related to the luminance of the elements of the lighting indications. The importance value for an element of the lighting indications may be different for different pixels in the buffer. The lighting value of pixels may be reprojected to account for changes in the viewing perspective between frames. The inputs to the function determining the relative importance for elements of the lighting indications may be persistent across frames. The inputs to the function determining the relative importance for elements of the lighting indications may be reprojected based on changes in the viewing perspective between frames.

There is also provided a non-transitory computer readable storage medium having stored thereon a computer readable description of an integrated circuit that, when processed in an integrated circuit manufacturing system, causes the integrated circuit manufacturing system to manufacture a graphics processing unit as described in any of the examples herein. The graphics processing units described herein may be embodied in hardware. There may also be provided an integrated circuit manufacturing system comprising: a non-transitory computer readable storage medium having stored thereon a computer readable description of an integrated circuit that describes a graphics processing unit as described in any of the examples herein; a layout processing system configured to process the integrated circuit description so as to generate a circuit layout description of an integrated circuit embodying the graphics processing unit as described in any of the examples herein; and an integrated circuit generation system configured to manufacture the graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

FIG. 6a shows a first level of a mip mapped initial light map as a 16×16 light map;

FIG. 6b shows a second level of a mip mapped initial light map as an 8×8 light map;

FIG. 6c shows a third level of a mip mapped initial light map as a 4×4 light map;

FIG. 6d shows a fourth level of a mip mapped initial light map as a 2×2 light map;

FIG. 6e shows a fifth level of a mip mapped initial light map as a 1×1 light map;

Figure 1:
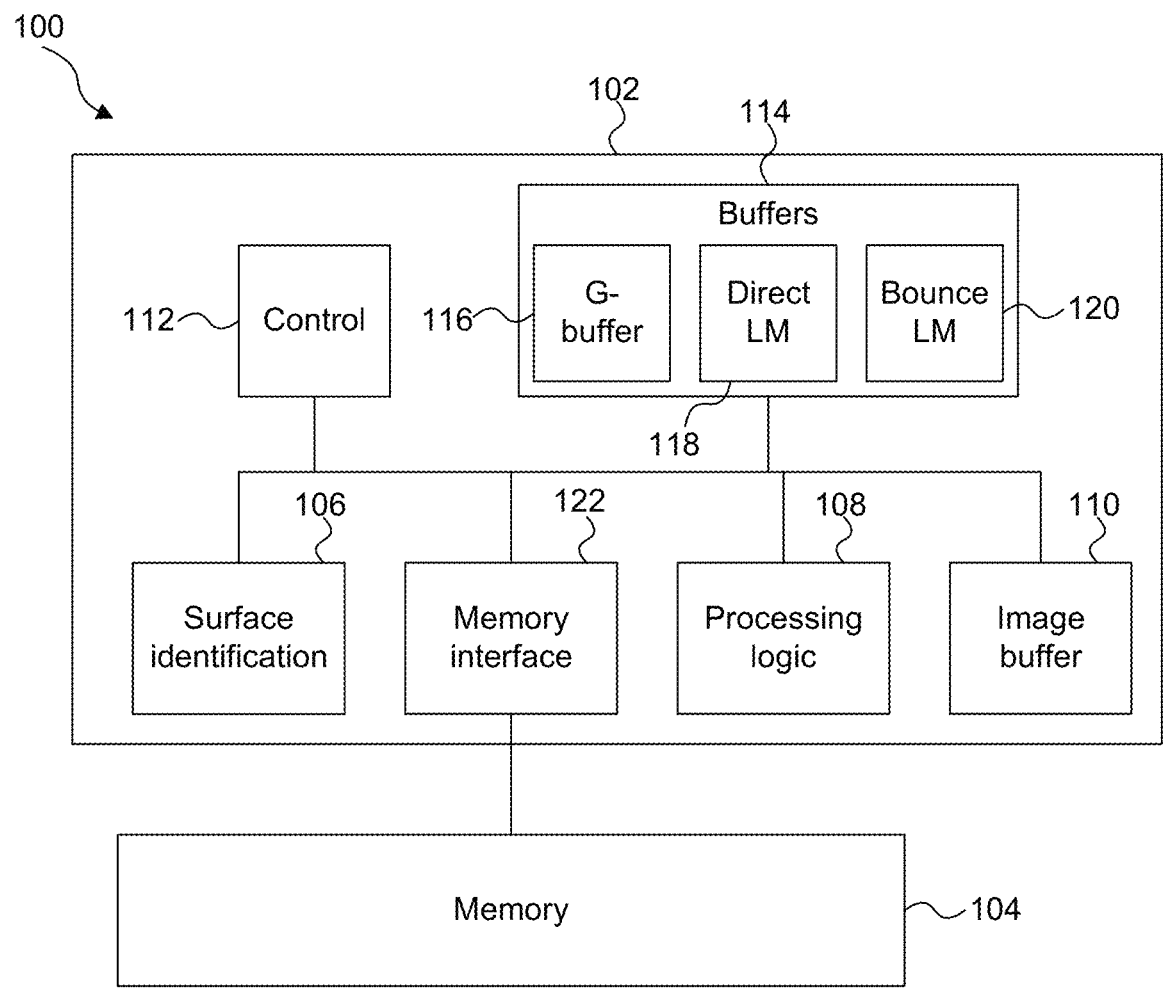
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

Examples are described herein in which two light maps are used: an initial light map (which may be referred to as a "source" light map) and a bounce light map (which may be referred to as a "destination" light map, or possibly a "render" light map). The bounce light map is used for rendering an image of a scene to represent lighting in the scene. The initial light map is built to supply an approximate indication of lighting in the scene which can be used to refine the bounce light map. The initial light map and the bounce light map are topologically the same and share the same geometry buffer. Texels of the light maps can be mapped into positions in scene-space using a "g-buffer", which contains multiple values of different types for each texel location. The g-buffer stores, for each light map texel, a surface normal and a position in scene-space which corresponds to the surface that the point on the object that corresponds with the center of the lightmap texel. In some examples, for each texel of the bounce light map, one or more sampling values are used to select a respective one or more texels from the initial light map according to an importance sampling technique. In this way, the likelihood of selecting a texel depends upon the magnitude of the importance value of the texel in the initial light map. Therefore, texels corresponding to important regions (e.g. bright regions) of the scene are more likely to be selected than texels corresponding to less important regions (e.g. dark regions) of the scene. Each selected texel is mapped into scene-space to determine a position within the scene and a ray is traced towards that position from the position in scene-space corresponding to the texel of the bounce light map. If a ray is not occluded then the lighting of the selected texel of the initial light map contributes to the lighting at the texel of the bounce light map, but if a ray is occluded then the lighting of the selected texel of the initial light map does not contribute to the lighting at the texel of the bounce light map. In either case, the value in the bounce light map is weighted to account for the probability that the texel in the initial light map was selected. If processing time and power were not important then for each texel of the bounce map, a sampling ray could be cast in every direction to determine the lighting at the texel, but to reduce processing time and power (e.g. if the baking of the light map is to be performed in real-time) then only a limited number of rays might be traced from each texel of the bounce map. By using the importance sampling method described herein, the rays which are traced are more likely to be directed towards more significant regions of the scene. In one example, the brightness or luminance of texels in the initial light map can be used as one of the importance criteria. Since brighter regions of the scene contribute more to the lighting of a texel, this can help to improve the determination of the lighting based on the limited number of rays.

FIG. 1 illustrates a graphics processing system 100 which comprises a graphics processing unit 102 and a memory 104. The graphics processing unit 102 comprises surface identification logic 106, processing logic 108, an image buffer 110, control logic 112, buffers 114 (comprising a geometry buffer 116, a direct light map buffer 118 and a bounce light map buffer 120) and a memory interface 122, which can communicate with each other via a bus within the graphics processing unit 102. The surface identification logic 106 is configured to identify surfaces within a scene being rendered. The processing logic 108 comprises one or more execution cores and is configured to process graphics data for surfaces identified by the surface identification logic 106. The image buffer 110 is configured to store rendered pixel values. The control logic 112 is configured to control the operation of the graphics processing system 100. The processing logic 108 is also configured to determine texel values of a bounce light map (for storage in the bounce light map buffer 120) which is used during the rendering of a frame to indicate the lighting in the scene being rendered. Data can be passed between the graphics processing unit 102 and the memory 104 via the memory interface 122.

Figure 2:
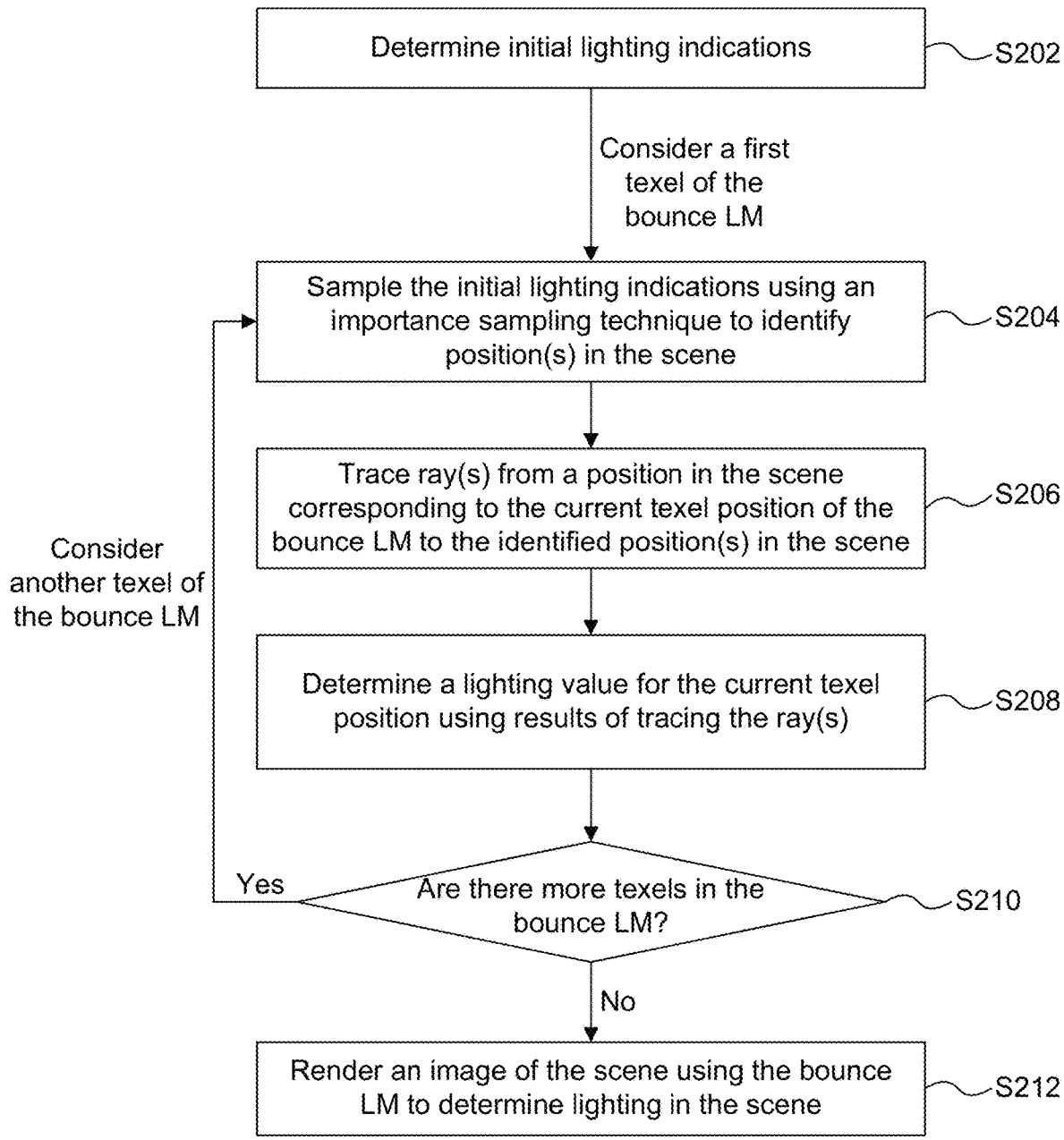
FIG. 2 is a flow chart for a method of graphics processing.

An example of the operation of the graphics processing system 100 is described with reference to the flow chart in FIG. 2.

Graphics data representing objects in a scene is received at the graphics processing unit 102. The graphics data may comprise primitives which represent surfaces of objects to be rendered. Primitives are often triangles, but can take other forms, e.g. other two-dimensional shapes like patches or nurbs, points, lines, 3-dimensional shapes like spheres or boxes. A primitive may be defined by a set of vertices, e.g. three vertices define a triangular primitive. The graphics data may include vertex data (e.g. position data and attribute data, such as texture data) for the vertices of the primitives in the scene and indications for the primitives to indicate which of the vertices form the primitives. The graphics data might also define attributes of light sources of the scene being rendered (e.g. position, direction, colour, etc.).

The graphics processing unit 102 operates to determine a bounce light map in real-time for a frame being rendered, and then uses the determined bounce light map to render an image of the scene with appropriate lighting. In some examples, the graphics processing unit 102 implements a progressive refinement approach to determining the bounce light map such that over a sequence of frames the values of the bounce light map can be progressively refined to converge towards a more accurate representation of the lighting of the scene. This means that the lighting for a particular frame does not need to be calculated anew for each frame, thereby reducing the processing cost in determining the bounce light map in real-time. This means that the bounce light map may take a few frames before becoming an accurate representation of the lighting in the scene.

In step S202 the processing logic determines initial light indications for the scene. The initial lighting indications are an approximate representation of the lighting in the scene. For example, the initial lighting indications may take the form of texel values of a direct light map. A "direct" light map stores the effects of direct lighting in the scene. Direct lighting is lighting at a surface position in the scene that occurs as a result of a line of sight between the surface position and a light source. Ray tracing, shadow mapping or some other technique could be used to construct the initial direct lighting. In contrast, indirect lighting is lighting at a surface position in the scene that occurs as a result of an indirect path between a light source and the surface position, e.g. as a result of one or more "bounces" or reflections of light from surfaces within the scene.

Figure 3:
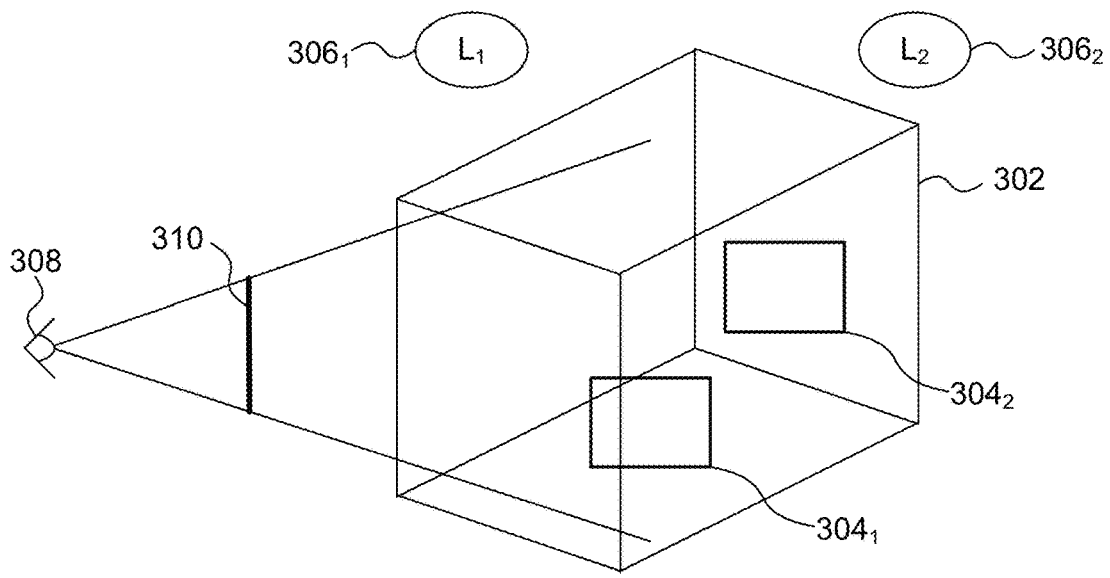
FIG. 3 illustrates a scene to be rendered from a viewpoint.

FIG. 3 shows an example of a scene 302 which includes two surfaces 3041 and 3042. This is a very simple example, and in other examples there would likely be many more surfaces and objects within the scene. FIG. 3 shows two light sources 3061 and 3062 which illuminate objects in the scene. The viewpoint from which the scene is viewed is shown at 308 and the view plane of the frame to be rendered is represented at 310.

The direct light map is stored in the buffer 118. The direct light map is built in an energy-conserving manner. For example, for each texel position of the direct light map, a corresponding surface position in the scene is determined in accordance with the data in the geometry buffer 116. Shadow rays are traced from the surface position for each texel position towards each light source 306 (e.g. one ray per texel per light source). If a ray is occluded then the light source does not contribute to the lighting at the texel position of the direct light map, whereas if a ray is not occluded then the light source does contribute to the lighting at the texel position of the direct light map. The amount that the light source contributes to the lighting at the texel position depends upon the area that the texel represents in scene space, the surface normal at the surface position (as indicated in the geometry buffer 116), the direction of the ray between the surface position and the light source, the distance between the surface position and the light source in the scene, and a brightness of the light source. For example, the amount of light contributed by a light source to a texel of the direct light map is scaled by the amount of incident surface area that the surface position corresponding to the texel presents to the light. So the contribution of a light source to a texel lighting value can be determined by multiplying the brightness of the light source by the area of the texel as transformed in scene space, multiplied by the dot product between the surface normal for the texel (indicated by the geometry buffer 116) and the ray direction towards to the light, divided by $d^2$ where d is the distance between the surface position and the light source in the scene. This means that texels that have more area in scene space tend to end up brighter than texels that are smaller when projected in to scene space if they are the same distance and orientation with respect to a light source.

In a simple example, which is described first, the direct light map 118 is used as an initial light map to represent an approximation of the lighting in the scene for use in determining the bounce light map. As described later, in other examples, an initial light map may be determined by combining the direct light map with a bounce light map determined for a previous frame.

Steps S204 to S210 are iterated for each texel of the bounce light map. In the example shown in FIG. 2, each texel of the bounce light map is processed in turn, but in other examples, multiple texels of the bounce light map may be processed together, in parallel.

In step S204, the processing logic 108 samples the initial light map using an importance sampling technique to identify one or more positions within the scene. The likelihood of identifying a position is based on an importance value of a texel of the initial light map which maps to the position in the scene. Step S204 may be performed in different ways in different examples, but FIG. 4 shows an example of the steps that could be performed as part of step S204.

Figure 4:
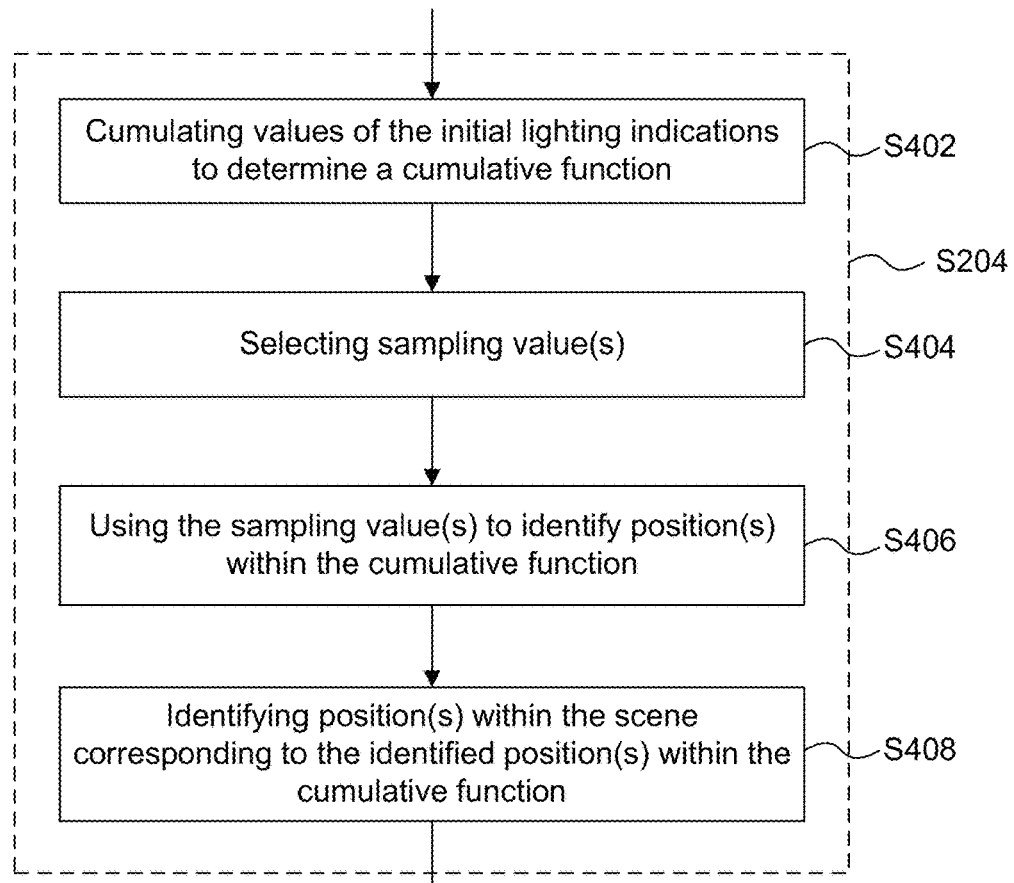
FIG. 4 is a flow chart for some of the steps performed to sample the initial lighting indications using an importance sampling technique.

In the example shown in FIG. 4 the luminance value of each texel in the initial light map (e.g. direct light map) is treated as an importance value in a probability distribution function. Brighter texels have a higher probability of being sampled because statistically they will contribute more to the lighting of the scene.

In step S402 values of the initial light map are cumulated to determine a cumulative function. For example, the probability distribution function is integrated to form a cumulative distribution function. The cumulative function is a monotonically increasing function that can be searched for a specific texel by sampling.

In step S404 one or more sampling values are selected. The sampling values may be selected randomly within a specified range, e.g. within a range from 0 to 1, or within a range from 0 to the total importance of the initial light map. For example, a table of sampling values may be stored in the graphics processing unit 102 (e.g. in a buffer 114) and the processing unit 108 can consult the table to determine the sampling value. Sampling values may be selected according to a low-discrepancy sequence, such as a Halton sequence or a Hammersley set. This would provide good coverage over the range of allowed sampling values. As the number of sampling values increases, the coverage over the range gets better when using a low-discrepancy sequence such as a Halton sequence. Alternatively, the sampling values may be selected randomly or pseudo-randomly, or according to a stratified sampling technique, or another quasi-monte-carlo technique.

In step S406 each of the selected sampling values is mapped into a position within the cumulative function. In other words, the selected sampling value(s) are used to identify respective position(s) within the cumulative function. For example, if the sampling value may be selected within the range from 0 to the total importance of the initial light map. The values of the cumulative function will range from zero (or close to zero) for the first texel position up to a value substantially equal to the total importance of the initial light map for the final texel position, because for the final texel position all of the initial light map texel values have been cumulated. Step S406 can involve determining the texel position of the cumulative function at which the value of the texel position first becomes greater than the sampling value. Due to the nature of the cumulative function, the likelihood of identifying a texel position is linearly dependent upon the value of the texel of the initial light map at that texel position.

In step S408 the positions within the initial light map that are identified in step S406 are mapped into world space using the geometry buffer 116 to identify corresponding positions within the scene.

Figure 5:
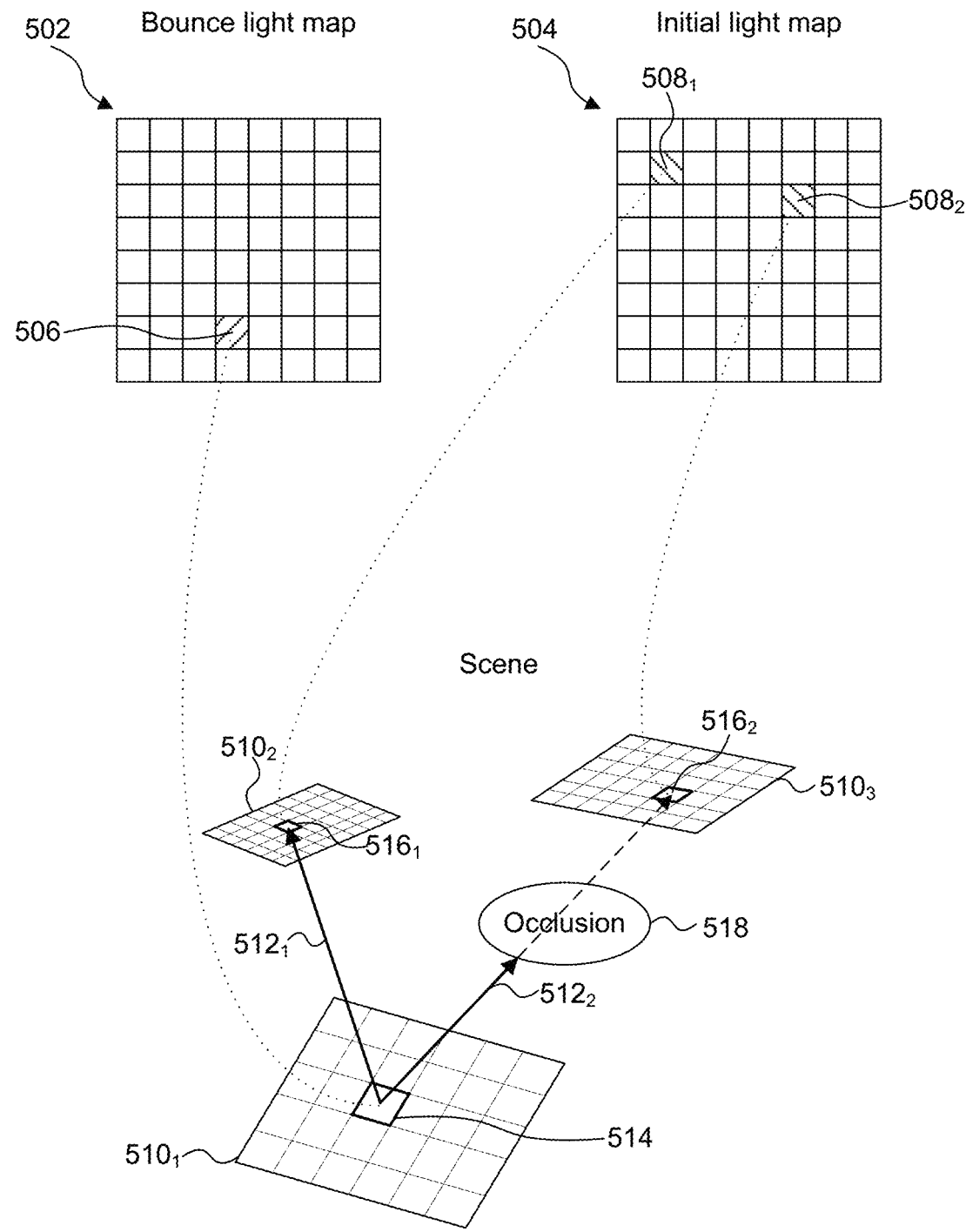
FIG. 5 illustrates an example of how light maps correspond to positions in the scene.

FIG. 5 shows an example of part of a bounce light map 502 and part of an initial light map 504. FIG. 5 also shows three surfaces $510_1$, $510_2$ and $510_3$ within the scene being rendered. A texel 506 of the bounce light map 502 is the texel currently being processed in steps S204 to S210. Texel 506 corresponds to a surface position 514 on the surface $510_1$. Texels $508_1$ and $508_2$ of the initial light map 504 have been identified in step S406. In step S408 the texel $508_1$ has been mapped to the surface position $516_1$ on surface $510_2$, and the texel $508_2$ has been mapped to the surface position $516_2$ on surface $510_3$.

In step S206 the processing logic 108 traces sampling rays ($512_1$ and $512_2$) from the position 514 towards each of the identified surface positions $516_1$ and $516_2$. FIG. 5 shows an occlusion 518 in the scene, which may be any element of geometry in the scene, e.g. a primitive. The occlusion 518 occludes the ray $512_2$ but does not occlude the ray $512_1$. Results of tracing the rays $512_1$ $512_2$ indicate whether or not the sampling rays hit an occlusion (e.g. occlusion 518).

In step S208 the processing logic 108 determines a lighting value for the current texel position (e.g. corresponding to texel 506 as shown in FIG. 5) using the results of the tracing of the sampling rays in step S206. For example, if a ray makes it to the identified surface position without being occluded then the value of the corresponding texel of the initial light map contributes to the lighting of the current texel of the bounce light map; but if a ray is occluded before reaching the identified surface position then the value of the corresponding texel of the initial light map does not contribute to the lighting of the current texel of the bounce light map. For example, ray $512_1$ is not occluded between position 514 and the identified surface position $516_1$, so the lighting value for the texel position 506 of the bounce light map 502 is determined based on the texel value $508_1$ of the initial light map 504. However, ray $512_2$ is occluded between position 514 and the identified surface position $516_2$ (by occlusion 518), so the lighting value for the texel position 506 of the bounce light map 502 does not receive contribution based on the texel value $508_2$ of the initial light map 504. The texel value is, however, adjusted based on the probability of choosing texel $508_2$ of the initial light map 504. More specifically, the value of the texel may be modified in inverse proportion to the likelihood of choosing the particular sample (i.e. the probability of choosing texel $508_2$).

Step S208 may determine the lighting of the texel 506 based on the distance between the position 514 and the position $516_1$. For example, if the surface position $516_1$ for which the sampling ray $512_1$ is unoccluded is close to the surface position $514_1$, then the lighting at the surface position 514 will be more affected by the lighting of the surface position $516_1$ than if the surface position $516_1$ is further away from the surface position $514_1$. For example, the effect of the lighting may decrease as $1/d^2$ where d is the distance between the surface positions 514 and $516_1$ in the scene.

The lighting contribution of texel 514 may be further modified based on a function of the angle between the normal value associated with destination texel 514 and the direction of the sampling ray 512. In addition, the contribution may be further modified by a function of the normal value associated with source texel $516_1$ and the direction of the sampling ray 512. These functions are intended to represent the reflectance distribution functions (BRDFs and/or BSDFs) associated with their respective materials. Often a simple cosine function is used for a perfectly diffuse reflection effect.

Furthermore, in some examples, the lighting indications may be stored as directionalised lighting values. Not all materials are perfectly diffuse so they don't all re-radiate the incoming light uniformly in a hemisphere from the surface. Some materials (most materials) have a strong specular component and radiate the light in a mirrored direction from the incoming direction. Materials can be described with a BRDF or BSDF (bidirectional reflectance distribution function or bidirectional scattering distribution function). As an example, each texel of the light maps (502 and/or 504) may be stored as a directionalised function. This means that the lighting at a surface position is dependent upon the direction from which the surface position is viewed. This may depend upon the surface normal at the surface position. For example, the light maps may store, for each texel position, spherical harmonic components which represent the lighting as a function of direction. For example, if a surface is reflective and it lit strongly from one direction then that surface will appear brighter from a direction corresponding to the angle of reflectance of the light. This is particularly true for specular reflections from very reflective surfaces such as glass and water, but it is also true for less reflective surfaces. In this case, step S208 may determine the lighting of the texel 506 based on the direction between the position 514 and the position $516_1$, i.e. based on the direction with which the sampling ray $512_1$ hits the surface position $516_1$.

In this way a lighting value for the current texel of the bounce map (e.g. texel 506 of the bounce map 502) can be determined.

In step S210 the processing logic 108 determines whether there are any more texels in the bounce light map to process. If there are, then the method passes back to step S204 and the steps S204 are repeated for another texel of the bounce light map. In some examples, the steps S204 to S210 may be performed for a set of one or more texels of the bounce map in each iteration.

If in step S210 it is determined that there are no more texels in the bounce light map for the current frame to process then the bounce light map has been determined. The determined bounce light map may be stored in the buffer 120. In step S212 the bounce light map is used for rendering an image of the scene. In particular an image of the scene is rendered using the bounce light map to determine lighting in the scene. The bounce light map is used to approximate Global Illumination (GI) for the scene. The rendering of the scene may be performed according to known techniques, and as such the details of the rendering step S212 are described at length herein. In brief, the rendering may involve identifying visible surfaces in the scene for each pixel position of the image (e.g. in the view plane 310) being rendered from the viewpoint 308 using the surface identification logic 106, and then for each pixel position executing one or more shader programs in the processing logic 108 to determine an image value for the pixel. The shader programs may use the bounce light map that has been determined for the current frame to determine the lighting at surface positions corresponding to the pixel positions. The bounce light map can be used in a similar manner to a texture, e.g. by sampling the light map with coordinates (u,v) and interpolating between light map texel values to determine a lighting value for a particular surface position corresponding to a pixel which is being rendered.

In some examples, the bounce light map may contain directionalized values. In that case, the surface normal of the visible surface will be used to determine the lighting retrieved from the bounce light map.

In some examples, the method might not repeat for all of the texels of the bounce light map. For example, the method might be performed only for texels of the light map which will be mapped to visible surfaces when the scene is rendered. When the bounce light map is transformed into the scene, some parts of the bounce light map may be visible from the viewpoint (e.g. 308), whilst other parts of the bounce light map may not be visible from the viewpoint. Therefore, a subset of the texels of the bounce light map may be selected for processing based on the visibility from a viewpoint in a scene. This avoids processing involved in determining texels of the bounce light map which will not be used when rendering the scene. Furthermore, texels in the bounce light map may be prioritized based on their respective contribution to a rendered frame, wherein the determination of contribution may be approximate and/or the prioritization may be coarse-grained. The contribution of a texel may be determined by the number of pixels to be rendered which relate to the texel, or by the location of the texel in the scene for example. In some cases, e.g. where a bounce light map is determined in real-time as frames are rendered, it might not be possible to fully determine all of the appropriate texels of the bounce light map, so it can be useful to prioritise the more important texels of the bounce light map. Prioritising a texel may, for example, mean that the texel is determined earlier than other texels in the bounce light map, or that more sampling rays are traced for the texel compared to other texels.

A bounce light map can be determined for each frame of a sequence of frames in real-time as the frames are being rendered. For a first frame of the sequence, the direct light map (stored in buffer 118) can be used as the initial light map and is used to determine the bounce light map for the current frame (which is then stored in the buffer 120).

For subsequent frames, a current direct light map is calculated in step S204 and is then combined with the bounce light map of the previous frame to determine the initial light map for the current frame. Alternatively, the initial lighting could be sampled from both the direct light map and the previously created bounce light map, and the two would not necessarily need to exist in the same buffer.

Furthermore, for these subsequent frames, the step of determining the lighting value for a texel position in the bounce light map comprises updating the existing lighting value for the texel position based on the results tracing the sampling rays in step S206. For example, a running average may be maintained for the lighting values of the bounce light map over the sequence of frames. The running average may effect a logarithmic decay of the values in the bounce light map, such that newer lighting values are weighted more heavily than older lighting values. The base of the logarithmic function can be changed in response to external factors including the speed at which the initial lighting indications are changing. For example, if the lighting in the scene is changing quickly then the logarithmic function can be decayed quickly because older lighting is less representative of the current lighting in the scene. In some examples, the running average may produce a progressive refinement effect by incrementing a numerator and a denominator separately.

In step S402 where the values of the initial light map are cumulated, the values may be cumulated in any suitable order, e.g. a raster scan order or a boustrophedon order. However, in a particular example, the values of the initial light map are cumulated in tiles of the initial light map. For example, the values of the initial light map texels may be cumulated to form a set of mip mapped light maps representing the initial light map at different resolutions. This may greatly improve the speed with which step S406 can be performed, i.e. the step of identifying a position with the cumulative function using a sampling value. For example, FIGS. 6a to 6e represent different mip mapped levels of an initial light map. In particular, FIG. 6a shows a 16×16 initial light map 602, FIG. 6b shows an 8×8 initial light map 604, FIG. 6c shows a 4×4 initial light map 606, FIG. 6d shows a 2×2 initial light map 608 and FIG. 6e shows a 1×1 initial light map 610. The different levels of the initial light map may be determined in step S202. For example, the initial light map may be determined at the finest resolution 602 (e.g. 16×16 in the simple example shown in FIG. 6a) and a lower mip map level light map 604 can be generated by averaging blocks (e.g. 2×2 blocks) of the current light map 602. This can be repeated through the different mip map levels until the lowest level mip mapped light map 610 is generated.

In this example, in step S406, the sampling value can be processed against the mip mapped initial light maps in an order from the lowest resolution mip mapped initial light map 610 to the highest resolution mip mapped initial light map 602. In this case, at each mip map level other than the finest resolution the processing logic 108 considers a 2×2 block of texels and decides which texel to descend, thereby identifying a 2×2 block of texel in the next finer resolution mip map level. Then in the mip mapped light map 602, one of the texels is selected, thereby identifying a texel position. This means that very few (e.g. only four) texels at each mip map level are considered to identify the texel position for a particular sampling value. This may be referred to as a binary search process. This can greatly reduce the amount of processing involved in mapping the sampling value to a texel position in the initial light map.

With reference to the example shown in FIGS. 6a to 6e, light map 610 indicates that the average luminance for the initial light map is 0.35. Since the finest resolution light map 602 has 256 texels, the total luminance for the image is approximately 89.6 since 0.35*256=89.6. (The actual sum of the values in light map 602 is 89.1, which is different to 89.6 due to rounding errors). In real implementations (rather than the extremely simplified examples shown in FIGS. 6a to 6e) the texel values will be represented with many more bits, e.g. they may be represented as 32-bit float numbers, so the rounding errors will be insignificant.

In this example, in which the values of the light maps are averages (rather than totals) the sampling value is selected within a range from 0 to 1. In other examples in which the values of the light maps are total values, the sampling value can be selected within a range from 0 to the total energy in the initial light map (e.g. in the range from 0 to 89.6 for this example shown in FIGS. 6a to 6e). The difference between total values and average values is just a multiply by the number of values.

Totals may perform better than averages due in part to better utilization of the precision of floating point values and also due in part to the loss of fewer bits of accuracy on account of performing fewer arithmetic operations, i.e. saving the division operations.

An example is described below for a sampling value of 0.5, which may be selected randomly or according to some other selection scheme, e.g. according to a low-discrepancy sequence, as described above. As explained below the sampling value of 0.5 maps to the first texel position in the tenth row of the initial light map 602 (which has a value of 1.0), and is shown in bold and denoted 618 in FIG. 6*a*. A sampling value of 0.5 should identify the texel position which takes the cumulative value over 0.5*the total luminance in the initial light map, so it is unsurprising that a texel position roughly in the middle of the initial light map 602 is identified. The search method may be implemented as a recursive method or a loop according to different design implementations.

The sampling value is multiplied by the average luminance value given by light map 610 to give a search value of 0.175 (i.e. 0.5*0.35=0.175). The search value is multiplied by the number of texels being considered to give 0.7 (i.e. 0.175*4=0.7). Then, one of the texels of the light map 608 is selected to descend by finding which of the four texels when cumulated in an order: (i) top left, (ii) top right, (iii) bottom left, then (iv) bottom right, is the first to exceed the search value. Therefore, in this case, the top left texel of light map 608 has a value of 0.32 which is below 0.7 so the top left texel is not descended; the top right texel of light map 608 has a value of 0.35, so the cumulative value at this point is 0.67 (i.e. 0.32+0.35=0.67) which is below 0.7 so the top right texel is not descended; the bottom left texel of light map 608 has a value of 0.27, so the cumulative value at this point is 0.94 (i.e. 0.32+0.35+0.27=0.94) which is above 0.7 so the bottom left texel is descended.

So for the light map 606, the bottom left 2×2 block of texels (denoted with dashed lines 612) is considered. The search value is set to be the number of texels in the block 612 (i.e. 4) multiplied by the remainder of the search value minus the last cumulative value to not exceed 0.7, i.e. the search value is set to be 0.12 since 4*(0.7−0.67)=0.12. Then, one of the texels of the bottom left 2×2 block of texels 612 from the light map 606 is selected to descend by finding which of the four texels when cumulated in an order: (i) top left, (ii) top right, (iii) bottom left, then (iv) bottom right, is the first to exceed the search value. Therefore, in this case, the top left texel of the 2×2 block 612 has a value of 0.38 which is above 0.12 so the top left texel of the 2×2 block 612 is descended.

So for the light map 604, the block of texels denoted with dashed lines 614 is considered. The search value is set to be the number of texels in the block 614 (i.e. 4) multiplied by the remainder of the search value minus the last cumulative value to not exceed 0.12, i.e. the search value is set to be 0.48 since 4*(0.12−0)=0.48. Then, one of the texels of the block of texels 614 from the light map 604 is selected to descend by finding which of the four texels when cumulated in an order: (i) top left, (ii) top right, (iii) bottom left, then (iv) bottom right, is the first to exceed the search value. Therefore, in this case, the top left texel of the 2×2 block 614 has a value of 0.75 which is above 0.48 so the top left texel of the 2×2 block 614 is descended.

So for the light map 602, the block of texels denoted with dashed lines 616 is considered. The search value is set to be the number of texels in the block 616 (i.e. 4) multiplied by the remainder of the search value minus the last cumulative value to not exceed 0.48, i.e. the search value is set to be 1.92 since 4*(0.48−0)=1.92. Then, one of the texels of the block of texels 616 from the light map 604 is identified by finding which of the four texels when cumulated in an order: (i) top left, (ii) top right, (iii) bottom left, then (iv) bottom right, is the first to exceed the search value. Therefore, in this case, the top left texel of the 2×2 block 616 has a value of 1.0 which is below 1.92 so the top left texel is not identified; the top right texel of block 616 has a value of 0.5, so the cumulative value at this point is 1.5 (i.e. 1.0+0.5=1.5) which is below 1.92 so the top right texel is not identified; the bottom left texel of block 616 has a value of 1.0, so the cumulative value at this point is 2.5 (i.e. 1.0+0.5+1.0=2.5) which is above 1.92 so the bottom left texel 618 is identified.

The exact texel identified by this method will vary depending on the value of the sampling value, but on average the likelihood of identifying a particular texel is directly proportional to the value of the particular texel. For example, a texel with a value of 0.0 will never be identified by this method, and a texel with a value of 1.0 is twice as likely as a texel with a value of 0.5 to be identified.

An example is described below for a sampling value of 0.9, which may be selected randomly or according to some other selection scheme, e.g. according to a low-discrepancy sequence, as described above. The sampling value of 0.9 maps to the texel 620 shown in bold in FIG. 6*a* which has a value of 0.5. A sampling value of 0.9 should identify the texel position which takes the cumulative value over 0.9*the total luminance in the initial light map, so it is unsurprising that a texel position roughly 90% of the way through the initial light map 602 is identified. A person skilled in the art would be able to take the above explanation of how a sampling value of 0.5 maps to the texel 618 to determine how a sampling value of 0.9 maps to the texel 620, but for some guidance, the bottom right texel of light map 608 is descended (which has a value of 0.47); the bottom left texel of the bottom right 2×2 block of light map 606 is descended (which has a value of 0.38); the bottom left texel of the corresponding block of light map 604 is descended (which has a value of 0.75); and the top left texel 620 of the corresponding block of light map 602 is identified (which has a value of 0.5). As described above, identifying a texel with a value of 0.5 is half as likely as identifying a texel with a value of 1.0, but it is still a valid outcome.

In the examples described above the initial lighting indications take the form of a light map. In other examples, the light energy may be spread among multiple initial light maps, so the importance sampling may factor in the total energy from more than one place. Furthermore, light maps can be inter-mixed with non-light-map light sources, as long as a mechanism exists to map to the appropriate place (light map, image-based light like a sky image, area light, spotlight, point light (with a minimum radius and therefore finite energy, i.e. to avoid a singularity caused by distance approaching zero, etc.). From these different indications of lighting, an approximation of the total light can be determined in some form for use in mapping the sampling value into a specific light source (texel) in a specific light map. A meta-table can be used to track how much contribution, and/or how much importance, comes from which map or other source.

Furthermore, distance may be a factor in the importance value. So rather than the importance value being simply the luminance value in the light map, the importance value can be some combination of the luminance value (L) of a texel and a distance (d) between the position in the scene corresponding to the texel position and the position in the scene corresponding to the texel of the bounce light map which is being processed (e.g. the distance between positions $516_1$ and 514). As an example the importance value (I) could be determined as $I=/d^2$. In this case the importance value then depends upon the texel of the bounce light map which is being processed. Therefore different importance values may be determined for each texel of the bounce light map that is processed. The simple technique described above in which the brightest points are treated the most important (i.e. I=L), is true on average, but might not be true for a specific texel of the bounce light map for which we are currently evaluating the lighting. Calculating a separate set of light maps for each texel of the bounce light map where the distance falloff is factored into the total energy might provide good results, but it would be computationally very expensive to implement, and might not be feasible if the bounce light map is intended to be baked in real-time. Therefore, to simplify the processing, it would be possible to group texels together (e.g. into blocks of texels which correspond to scene positions which are close to each other, e.g. 16×16 blocks of texels or some other size/shape blocks of texels) and determine importance values for each of the groups (e.g. based on average distances of the different positions for the group to each of the texels of the initial light map). Then the relative importance of different regions can be evaluated differently for different sample points depending on their position.

Groups of texels could be stored hierarchically, and a bounding volume hierarchy or a similar structure could be used to quickly calculate an approximate distance for entire groups, which could, in turn, effect the importance of a texel or set of texels for the purpose of evaluating a given texel in the bounce light map.

In general, Importance Sampling basically says that we apply an attenuation that is the inverse of the probability of having arrived at the sample randomly. So any importance function should produce accurate results (performance may vary) as long as we can consistently map all of the samples for a given sample point (point receiving lighting, or texel in the bounce light map) through the same importance function.

As another optimization, direction may be a factor in the importance value. So rather than the importance value being simply the luminance value (L) in the light map or $L/d^2$, the importance value can be some combination of the luminance value (L) of a texel (and possibly distance d as well) and a direction ($\hat{r}$) of a ray between the position in the scene corresponding to the texel position in the initial lighting map and the position in the scene corresponding to the texel of the bounce light map which is being processed (e.g. the direction of the ray $512_1$ between positions $516_1$ and $514$). As an example the importance value (I) could be determined as $I=L\hat{r}\cdot\hat{n}$ where $\hat{n}$ is a surface normal direction of the surface at position $516_1$ (as indicated by the geometry buffer $116$). If the texel values of the initial light map are directionalised values (e.g. spherical harmonic components) then the importance values could also take account of the direction of those components as well as the direction of the ray $\hat{r}$ and the surface normal n. The importance values could also take account of the surface normal of the surface position $514$ corresponding to the texel of the bounce light map being processed. In this way, we can, on average, send more sampling rays towards initial light map elements due to their particular scattering direction.

In examples described above the importance values are based wholly or partially on the luminance values of the elements of the initial light map. In other examples, the importance value may be based wholly or partially on known changes in the initial lighting indications. For example, the known changes may include differences between the initial lighting indication of the present frame and the initial lighting indications of a prior frame. Making regions which have changed more important means that sampling rays are more likely to be traced towards the regions which have changed. This can be useful when the bounce light map is iteratively refined over a number of frames, since non-changing lighting effects might already be well represented in the bounce light map from a previous frame whereas the changing lighting is less well represented by using the previous frame's bounce light map.

The examples described above use the importance sampling for baking a bounce light map. That is, the importance sampling technique described above allows a direct light map to bake data into an indirect light map in a very convenient manner and leads to a very elegant pipeline where the bounce light map we just baked (for the previous frame, e.g. the immediately preceding frame in a sequence of frames) can be merged with the new direct lighting (for a current frame) to get 2nd, 3rd, 4th etc. generation bounced light over a sequence of frames. However, in other examples, the importance sampling technique could be used for other purposes. Having a direct light map to represent the lighting in the scene means you could sample the lighting (for multiple bounces) using the methods described above as part of the process of rendering a a pixel. This would be less efficient to implement in terms of processing costs, but potentially much better quality since it would not rely on lighting information determined for previous frames, and would not be limited by the resolution of the light map on the visible surfaces.

In some examples, a limited set of positions are identified towards which sampling rays are traced, and those identified positions are shared among sets of texels of the bounce light map for tracing sampling rays. This means that a position does not need to be identified for each texel of the bounce light map, and sampling rays can be traced towards the same position for a set of texels of the bounce light map.

In some examples, the elements of the initial lighting indications are organized into a hierarchy based on the spatial locations of the corresponding points. In other examples, the initial lighting indications are directionalized lighting values, and the elements of the initial lighting indications are organized into a hierarchy based on the predominant directions of the values stored in directionalized lighting values.

In additional embodiments, multiple importance functions can be considered in the selection of sample ray directions. For example, rays selected to evaluate visibility to a predetermined destination can be intermixed with rays having a stochastically chosen direction and no pre-determined destination. This could be used to evaluate several different types of lighting simultaneously contributing to a lit surface or lightmap. The relative importance of different light sources may vary from different sampling positions so the relative likelihood of choosing certain ray emission behaviours or the ratio of rays emitted can be influenced by an importance determination.

In the examples described herein the "light" tends to represent visible light. However, the principles described herein not not require the rays to represent visible light. For example, more generally, the "light" can represent any propagating phenomenon including non-visible electromagnetic radiation, radio signals, and even acoustic vibrations, ballistic motion, and fluid dynamics.

Figure 7:
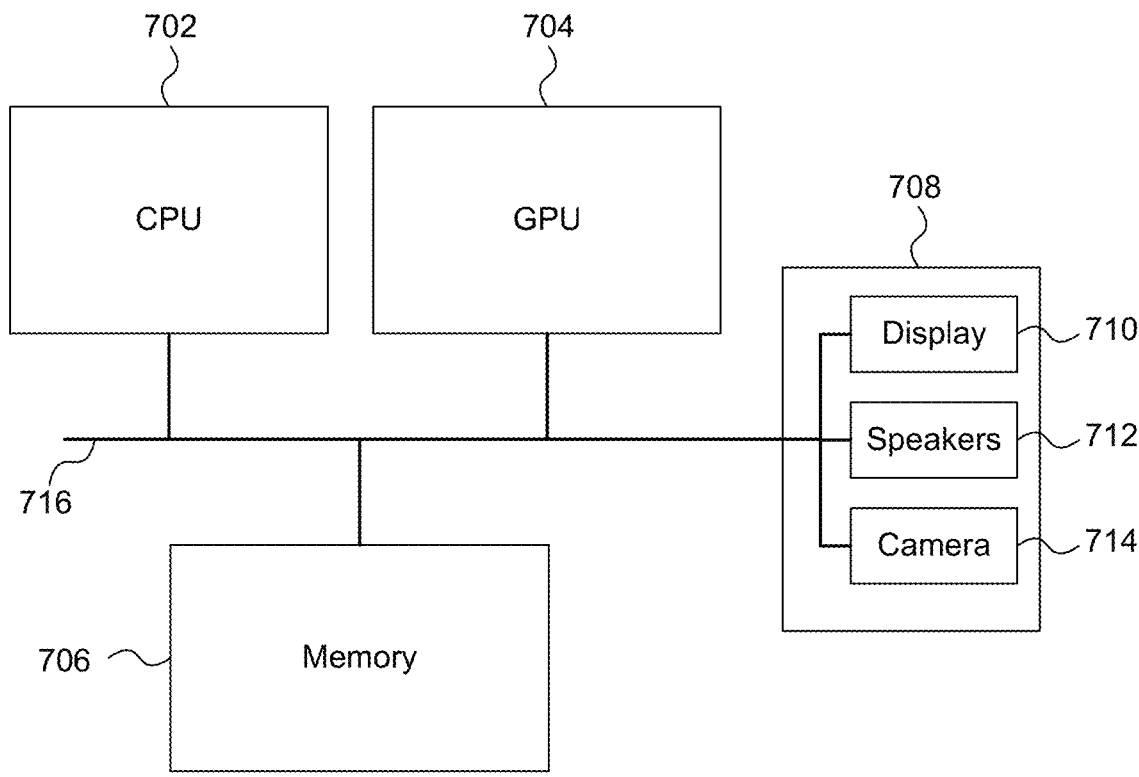
FIG. 7 shows a computer system in which a graphics processing system is implemented.

FIG. 7 shows a computer system in which the graphics processing systems described herein may be implemented. The computer system comprises a CPU $702$, a GPU $704$, a memory $706$ and other devices $708$, such as a display $710$, speakers $712$ and a camera $714$. The GPU $704$ may correspond with the GPU $102$ described above. The memory $706$ may correspond with the memory $104$ described above. The components of the computer system can communicate with each other via a communications bus 716.

The graphics processing unit 102 is shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 8.

Figure 8:
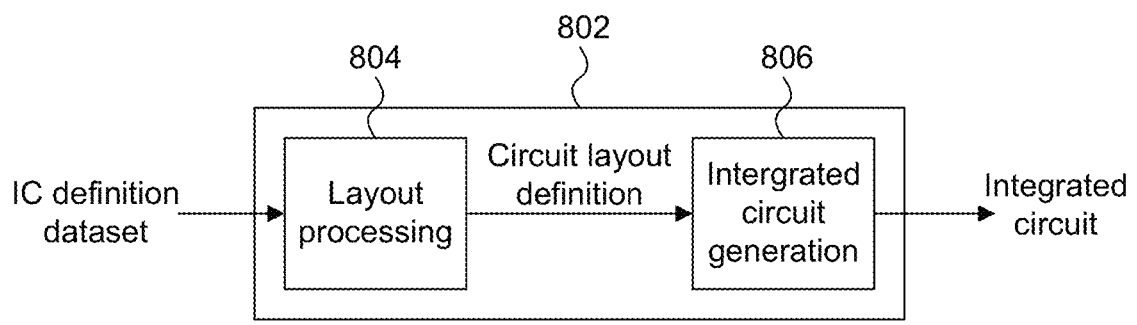
FIG. 8 shows an integrated circuit manufacturing system for generating an integrated circuit embodying a graphics processing system.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 802 to manufacture an integrated circuit embodying a graphics processing unit as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit configured to determine a light map for use in rendering a scene, the graphics processing unit comprising:
processing logic configured to:
use an importance sampling technique to identify one or more positions within the scene;
trace one or more rays towards the one or more identified positions within the scene; and
determine a lighting value of the light map using one or more results of tracing the one or more rays.

2. The graphics processing unit of claim 1, wherein the processing logic is configured to determine initial lighting indications, representing lighting at respective positions within the scene, by:
building a direct light map representing direct lighting in the scene; and
combining the direct light map with a light map determined for a previous frame in a sequence of frames to thereby determine an initial light map for a current frame.

3. The graphics processing unit of claim 1, wherein the processing logic is configured to identify the one or more positions by sampling initial lighting indications, representing lighting at respective positions within the scene, using the importance sampling technique, comprising:
cumulating values of the initial lighting indications according to a cumulation scheme to determine a cumulative function representing lighting within the scene;
selecting one or more sampling values;
using the selected one or more sampling values to identify a respective one or more positions within the cumulative function; and
identifying the one or more positions within the scene corresponding to the identified one or more positions within the cumulative function.

4. The graphics processing unit of claim 3, wherein the initial lighting indications are represented as an initial light map, and wherein the processing logic is configured to cumulate values in tiles of the initial light map to form a set of mip mapped light maps representing the initial light map at different resolutions.

5. The graphics processing unit of claim 1, wherein the processing logic is further configured to render an image using the light map to determine lighting of surfaces within the scene.

6. The graphics processing unit of claim 1, wherein the processing logic is configured to trace the one or more rays from a position in the scene corresponding to a texel position of the light map based on one or more identified positions within the scene, and wherein the lighting value of the light map determined using the one or more results of tracing the one or more rays is a lighting value for the texel position of the light map.

7. The graphics processing unit of claim 6, wherein the processing logic is configured to determine the lighting value for the texel position of the light map by updating an existing lighting value for the texel position based on the results of the tracing of the one or more rays, wherein said updating the existing lighting value for the texel position comprises maintaining a running average for the lighting value for the texel position over a sequence of frames.

8. The graphics processing unit of claim 7, wherein the running average effects a logarithmic decay of the values in the light map, wherein the base of the logarithmic function is changed in response to external factors including the speed at which initial lighting indications, representing lighting at respective positions within the scene, are changing.

9. The graphics processing unit of claim 7, wherein the running average produces a progressive refinement effect by incrementing a numerator and a denominator separately.

10. A computer-implemented method of determining a light map for use in rendering a scene, the method comprising:
   using an importance sampling technique to identify one or more positions within the scene;
   tracing one or more rays towards the one or more identified positions within the scene; and
   determining a lighting value of the light map using one or more results of tracing the one or more rays.

11. The computer-implemented method of claim 10, further comprising determining initial lighting indications, representing lighting at respective positions within the scene, by:
   building a direct light map representing direct lighting in the scene; and
   combining the direct light map with a light map determined for a previous frame in a sequence of frames to thereby determine an initial light map for a current frame.

12. The computer-implemented method of claim 10, further comprising identifying the one or more positions by sampling initial lighting indications, representing lighting at respective positions within the scene, using the importance sampling technique, by:
   cumulating values of the initial lighting indications according to a cumulation scheme to determine a cumulative function representing lighting within the scene;
   selecting one or more sampling values;
   using the selected one or more sampling values to identify a respective one or more positions within the cumulative function; and
   identifying the one or more positions within the scene corresponding to the identified one or more positions within the cumulative function.

13. The computer-implemented method of claim 12, wherein the initial lighting indications are represented as an initial light map, and wherein the processing logic is configured to cumulate values in tiles of the initial light map to form a set of mip mapped light maps representing the initial light map at different resolutions.

14. The computer-implemented method of claim 10, further comprising rendering an image using the light map to determine lighting of surfaces within the scene.

15. The computer-implemented method of claim 10, further comprising:
   tracing the one or more rays from a position in the scene corresponding to a texel position of the light map based on the one or more identified positions within the scene, and
   wherein the lighting value of the light map determined using the one or more results of tracing the one or more rays is a lighting value for the texel position of the light map.

16. The computer-implemented method of claim 15, further comprising:
   determining the lighting value for the texel position of the light map by updating an existing lighting value for the texel position based on the results of the tracing of the one or more rays, wherein said updating the existing lighting value for the texel position comprises maintaining a running average for the lighting value for the texel position over a sequence of frames.

17. The computer-implemented method of claim 16, wherein the running average effects a logarithmic decay of the values in the light map, wherein the base of the logarithmic function is changed in response to external factors including the speed at which initial lighting indications, representing lighting at respective positions within the scene, are changing.

18. The computer-implemented method of claim 16, wherein the running average produces a progressive refinement effect by incrementing a numerator and a denominator separately.

19. The computer-implemented method of claim 10, wherein either:
   the elements of initial lighting indications, representing lighting at respective positions within the scene, are organized into a hierarchy based on the spatial locations of the corresponding points; or
   the initial lighting indications, representing lighting at respective positions within the scene, are directionalized lighting values, and the elements of the initial lighting indications are organized into a hierarchy based on the predominant directions of the values stored in directionalized lighting values.

20. A non-transitory computer-readable storage medium having stored thereon an integrated circuit definition dataset that, when processed in an integrated circuit manufacturing system, configures the system to manufacture a graphics processing unit which is configured to determine a light map for use in rendering a scene, the graphics processing unit comprising:
   processing logic configured to:
      use an importance sampling technique to identify one or more positions within the scene;
      trace one or more rays towards the one or more identified positions within the scene; and
   determine a lighting value of the light map using one or more results of tracing the one or more rays.

* * * * *